US006790353B2

(12) United States Patent
Connelly, Jr.

(10) Patent No.: US 6,790,353 B2
(45) Date of Patent: Sep. 14, 2004

(54) DEVICE FOR AUTOMATICALLY FEEDING SOLUBLE FLUID TREATING AGENTS INTO A FLUID BODY

(75) Inventor: Thomas V. Connelly, Jr., Kirkwood, MO (US)

(73) Assignee: Solutia, Inc., St. Louis, MO (US)

( * ) Notice: Subject to any disclaimer, the term of this patent is extended or adjusted under 35 U.S.C. 154(b) by 114 days.

(21) Appl. No.: 10/064,871

(22) Filed: Aug. 26, 2002

(65) Prior Publication Data

US 2002/0185455 A1 Dec. 12, 2002

Related U.S. Application Data

(63) Continuation-in-part of application No. 09/825,481, filed on Apr. 3, 2001, now Pat. No. 6,511,605.

(51) Int. Cl.$^7$ .................................................. C02F 1/00
(52) U.S. Cl. ...................... 210/198.1; 210/169; 210/205; 210/241
(58) Field of Search ............................... 210/169, 198.1, 210/205, 241

(56) References Cited

U.S. PATENT DOCUMENTS

| | | | |
|---|---|---|---|
| 3,356,460 A | 12/1967 | King et al. | |
| 3,390,695 A | 7/1968 | King et al. | |
| 3,483,989 A | 12/1969 | Gopstein | |
| 3,846,078 A | * 11/1974 | Brett | 422/264 |
| 4,420,394 A | * 12/1983 | Lewis | 210/169 |
| 4,917,868 A | * 4/1990 | Alexander et al. | 422/119 |
| 5,651,880 A | * 7/1997 | Johnson | 210/126 |
| 5,656,159 A | * 8/1997 | Spencer et al. | 210/206 |
| 5,885,446 A | * 3/1999 | McGrew, Jr. | 210/91 |
| 5,888,386 A | * 3/1999 | Enright et al. | 210/169 |

* cited by examiner

*Primary Examiner*—Betsey Morrison Hoey
(74) *Attorney, Agent, or Firm*—Blackwell Sander Peper Martin LLP (57) ABSTRACT

The present invention provides several embodiments of a device for automatically feeding soluble fluid treating agents in both tablet and granular form into a fluid body such as a swimming pool, spa or toilet bowl tank. Each embodiment includes a holding member for holding the soluble fluid treating agents which is selectively moveable along at least a portion of the length of a shaft member so as to adjustably position the soluble fluid treating agents relative to the fluid body. The shaft member is removably attachable to a base member that holds the device in operative position. The holding member can be selectively positioned such that any portion of the soluble fluid treating agents can be immersed within the fluid body. When a plurality of tablets are utilized, the holding member includes an elongate portion and each tablet preferably includes an opening extending therethrough adaptable for receiving the elongate portion.

40 Claims, 6 Drawing Sheets

DEVICE FOR AUTOMATICALLY FEEDING SOLUBLE FLUID TREATING AGENTS INTO A FLUID BODY

CROSS REFERENCE TO RELATED APPLICATIONS

This application is a continuation-in-part of application Ser. No. 09/825,481, filed Apr. 3, 2001, now U.S. Pat. No. 6,511,605.

BACKGROUND OF INVENTION

The present invention relates generally to fluid treatment devices containing a supply of solid agents soluble in the fluid to be treated and, more particularly, to devices for automatically feeding soluble fluid treating agents into a fluid body.

Water and other fluid treatment tablets containing a wide variety of different types of soluble treating agents are used in a wide variety of different fluid treatment applications such as water treatment, cleaning, laundry and dish washing applications, cooling tower applications, toilet bowl, pool and spa applications, sewage treatment and still other applications. For example, a wide variety of different types of toilet bowl tablets are available for sanitizing, cleaning and deodorizing toilet bowl water after each flush. In similar fashion, a wide variety of swimming pool and spa tablets are likewise available for use in controlling the chlorination, pH factor and total alkalinity of the swimming pool/spa water. In many of these applications, it is desirable for the soluble tablets to last a long time and to deliver a continuous prescribed dosage of treating agents to the particular fluid body.

At the present time, these tablets are typically placed, for example, at the bottom of a toilet bowl tank or at the bottom of a swimming pool skimmer basket member for fluid treatment purposes. These tablets are typically manufactured with sufficient treating agents to match a particular application such as a typical toilet bowl tank or a typically sized swimming pool or spa. However, as a tablet dissolves, the surface area of the tablet diminishes and the tablet delivers a declining dosage amount of treating agents thereby delivering less than the prescribed amount of agents to accomplish the particular fluid treatment application. As a result, additional tablets should be added during the dissolving process in order to maintain the desired chemical dosage level to accomplish the particular application.

This problem is best exemplified in the utilization of treatment tablets for sanitizing toilet bowl tanks. In this particular application, toilet bowl tablets presently marketed will typically kill 99.9% of germs in the toilet bowl water after each flush for up to approximately seven (7) weeks. However, these tablets will typically last up to twelve (12) weeks before they are completely dissolved. During the last five (5) weeks of usage, these tablets are generally too small in surface area to deliver enough chlorine or other treating agents to the fluid body to kill germs at the advertised 99.9% level. Therefore, in order to maintain the advertised germ kill rate, a user must add an additional tablet to the toilet bowl tank sometime during the dissolving process in order to maintain the advertised germ kill rate. If this additional tablet is, in fact, added to the fluid body along with the remainder of the first tablet, the combination of the two tablets will now deliver more sanitizing agents to the fluid body than is necessary. This is both undesirable and non-economical. In reality, a replacement tablet is typically not added to the toilet bowl tank until the first tablet is fully dissolved.

A similar problem also occurs in the swimming pool and spa environment. For example, many pool owners place a wide variety of water treatment tablets such as chlorine/sanitizing tablets into the skimmer basket member in order to sanitize the pool water. As these tablets dissolve, the amount of chlorine delivered to the water diminishes. Eventually, the tablets stop delivering the proper amount of water treatment agents necessary to keep the pool clean and properly chlorinated. As in the case of the toilet bowl sanitizing tablets, a pool owner must again place additional tablets in the skimmer basket member in order to achieve the proper chlorination level including keeping the pH factor and the total alkalinity within the proper range. Typically, additional tablets will have to be added to the skimmer basket member every three to five days depending upon the pool water conditions.

Many different types of chemical feeders including liquid treatment devices for automatically dispensing treating agents into a liquid body have been designed and used. See, for example, U.S. Pat. Nos. 3,356,460; 3,390,695; and 3,483,989. However, most of these devices have been complicated to use and expensive to manufacture. The known non-pressurized devices typically have complicated valve arrangements that tend to fail over time and the known pressurized devices typically cover or immerse the bulk of the water treating tablets or other soluble agents with water and then require metering of the saturated solution.

It is therefore desirable to develop a simple, economical device which will store a plurality of fluid treatment tablets and automatically feed such tablets into the fluid body so as to maintain a relatively constant tablet surface area within the fluid body so as to deliver a substantially continuous prescribed treatment dosage to the fluid body.

Accordingly, the present invention is directed to overcoming one or more of the problems as set forth above.

SUMMARY OF INVENTION

In one aspect of the present invention there is disclosed a device for automatically feeding a plurality of soluble tablets into a fluid body, the present device including at least one shaft member, an elevator member having an elongate portion and a platform portion, an attachment member, and a base member. The elevator member is adaptable for holding a plurality of tablets, preferably in a stackable arrangement, and is selectively positionable relative to at least a portion of the length of the shaft member such that, when a plurality of tablets are arranged thereon, the elevator member can be positioned such that any portion of one or more of the plurality of tablets can be immersed within the fluid body. The attachment member is configured for removably receiving one end portion of the shaft member such that the shaft member and elevator member can be easily disengaged therefrom for quick and easy loading of the soluble treating agents. Although the attachment member can take on a wide variety of different configurations depending upon the particular application, it will typically be fixedly attached to a portion of the structure surrounding or containing a portion of the fluid body therewithin.

In another aspect of the present invention there is disclosed a device for automatically feeding a plurality of granular tablets into a fluid body, the present device including at least one shaft member, a basket member, an attachment member, and a base member. The basket member is adaptable for holding a plurality of granules and is selectively positionable relative to at least a portion of the length of the shaft member such that, when a plurality of granules are contained therein, the basket member can be positioned such that any portion of the plurality of granules can be immersed within the fluid body.

In still other aspects of the present invention, the automatic feeding of a soluble fluid treating agent is incorporated into a typical automatic chlorinator device associated with swimming pools and in a free-floating flotation device designed for floating in a free-standing body of water such as a swimming pool.

The present device has particular utility in a wide variety of different fluid treatment applications including toilet bowl tank applications as well as swimming pool/spa applications. In these applications, some of the embodiments of the present device can be attached to any appropriate structure associated with the structure containing the fluid body such as the floor portion associated with a typical toilet bowl tank, or it can be attached to the basket member floor associated with a typical swimming pool/spa skimmer device. In a preferred embodiment, each tablet includes an opening extending therethrough adaptable for receiving the elongated member associated with the present device, each of the plurality of tablets being slidably positionable onto the elongated member and being supported by the platform member for movement therewith.

These and other aspects and advantages of the present invention will become apparent upon reading the detailed description in connection with the drawings and appended claims.

BRIEF DESCRIPTION OF DRAWINGS

For a better understanding of the present invention, reference may be made to the accompanying drawings.

DETAILED DESCRIPTION

Figure 1:
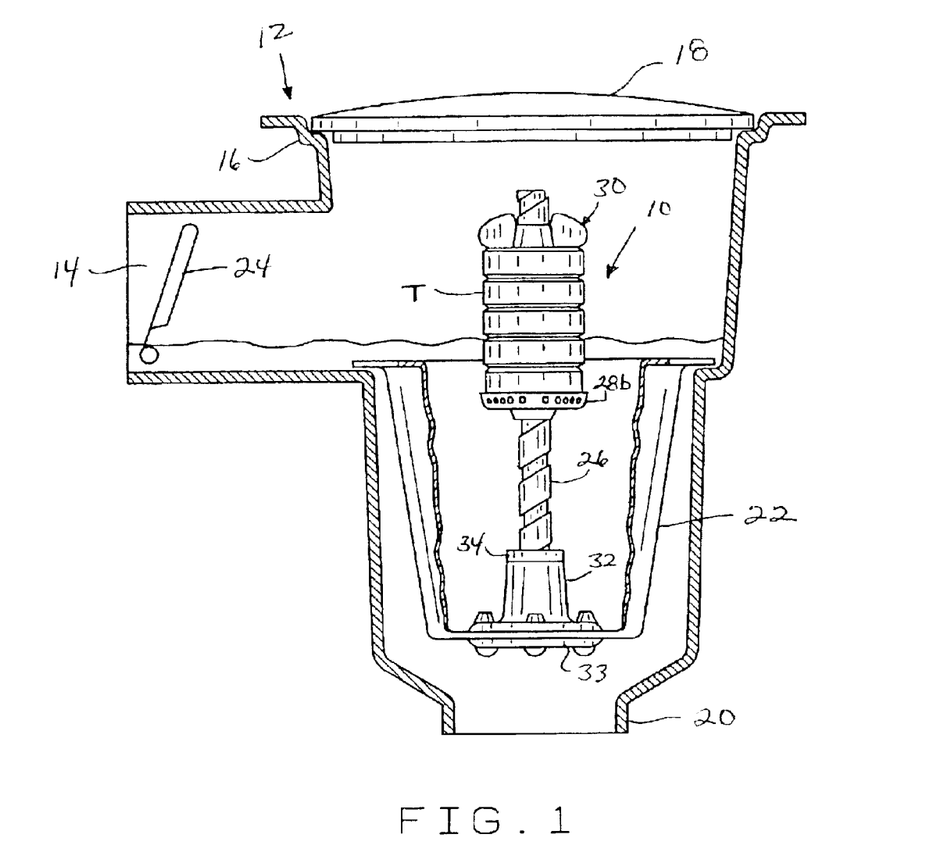
FIG. 1 is a cross-sectional view of a typical skimmer device showing one embodiment of the present feeder device positioned operatively therein.

Referring now to the drawings wherein like numerals refer to like parts, FIG. 1 illustrates one embodiment of an automatic tablet feeder device 10 that is particularly adaptable for use in a typical skimmer device 12 associated with a swimming pool, spa or other similar structure (not shown). Skimmer device 12 includes a water or fluid inlet portion 14 commonly associated with a side wall surface of a swimming pool or spa, a collar portion 16 having a cover member 18 associated therewith, a water or fluid outlet portion 20 typically in communication with a suction pump and recirculating means for directing the water back into the pool or spa, and a skimmer basket member 22 positioned in outlet portion 20 for catching leaves and other debris that may accumulate within the particular pool or spa. Cover member 18 is typically positioned and located for access adjacent the pool deck area and, when cover member 18 is removed, provides access to skimmer basket member 22 located therebelow. A flapper valve or weir assembly 24 is pivotally mounted adjacent entry to fluid inlet portion 14, which assembly controls fluid flow through skimmer device 12. As water flows through skimmer device 12, debris will collect within skimmer basket member 22 for periodic removal therefrom through cover member 18. Chlorinating tablets and other tablets containing fluid treating agents are typically placed at the bottom of skimmer basket member 22 for dissolving into the water or fluid body.

Figures 2, 3, 4:
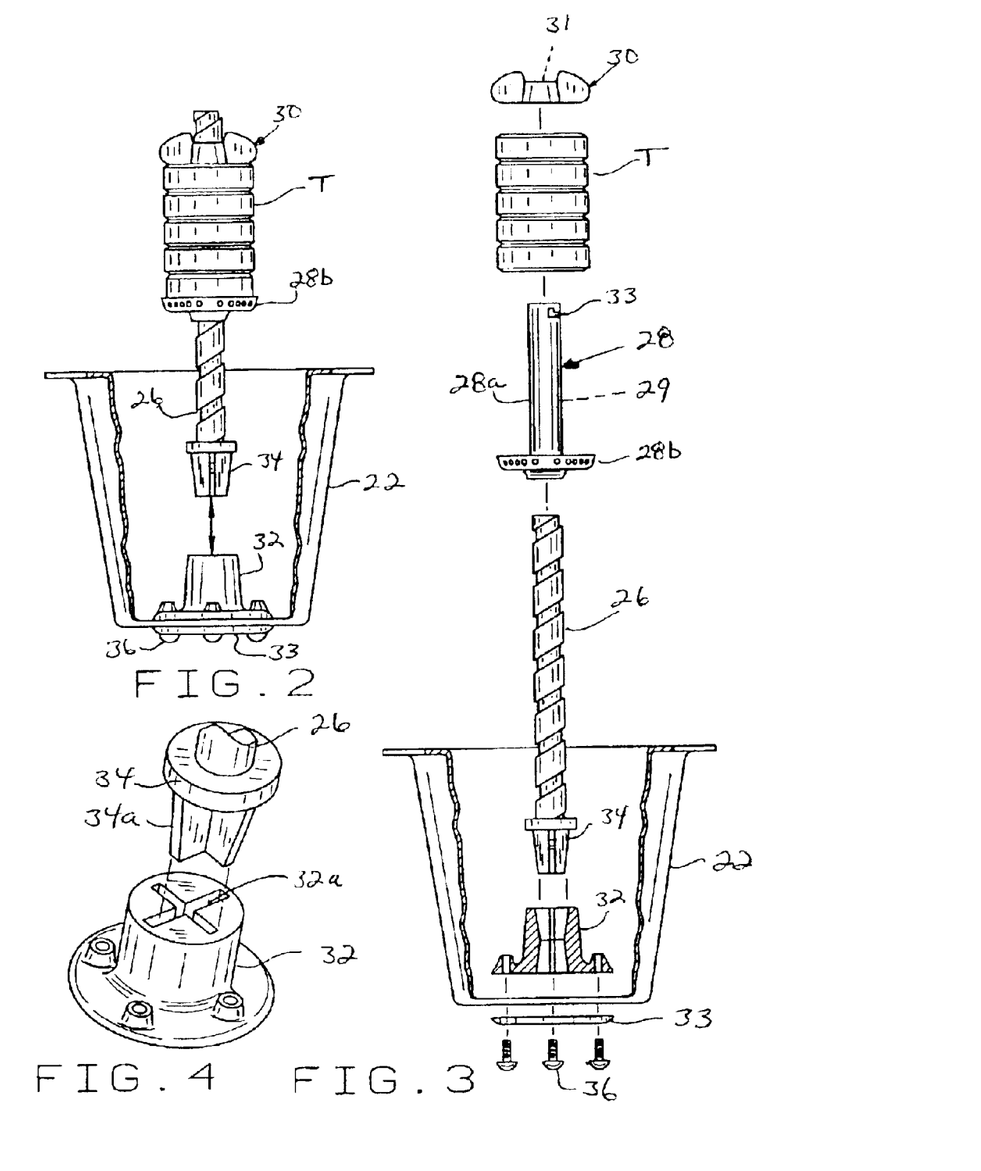
FIG. 2 is a cross-sectional view of the feeder device of FIG. 1 shown in exploded view illustrating the attachment of the shaft member of the present feeder device to the base member associated therewith.
FIG. 3 is exploded view similar to FIG. 2 illustrating the assembly of the feeder device of FIG. 1 and the attachment thereof to a typical skimmer device.
FIG. 4 is a perspective view of the cooperative engagement of the shaft and base members of the feeder device illustrated in FIG. 1.

The embodiment 10 of the present feeder device illustrated in FIGS. 1–3 includes a shaft member 26, a moveable or adjustable elevator member or tablet holding member 28 having an elongate portion 28a and a platform portion 28b, a handle member 30, a base member 32, a backing plate 33, and an attachment portion 34 associated with one end portion of shaft member 26. The elongate portion 28a of elevator member 28 includes a passageway 29 extending therethrough adaptable for receiving shaft member 26. Elevator member 28 is selectively adjustably movable relative to shaft member 26. This can be accomplished in a variety of known ways. For example, as shown in FIGS. 1–3, shaft member 26 is preferable threaded along an appropriate portion of its length and the passageway 29 is preferably correspondingly threaded so as to be threadably adjustable along the length of shaft member 26. This allows the user to adjustably position the platform 28b of elevator member 28 relative to the fluid level associated with the particular fluid body by simply threadedly moving elevator member 28 up or down along shaft member 26 so as to locate platform 28b at the proper location within the fluid body. This adjustment feature allows any portion of one or more of the lowermost tablets T positioned on platform portion 28b to be properly disposed or immersed in the fluid body for dissolution therein. This adjustability can be similarly accomplished using other known methods for adjustably positioning elevator member 28 relative to the length of shaft member 26.

Handle member 30 is provided to more easily adjust elevator member 28 relative to shaft member 26. Handle member 30 may be removably attached to shaft member 26 by any number of known methods, some of which will be described in the various embodiments of the present device described hereinafter. It is contemplated, however, that any suitable means of attaching handle member 30 to shaft member 26 may be used without departing from the spirit and scope of the present invention. In the embodiment of the present invention illustrated in FIGS. 1–3, handle member 30 has an axial bore 31 extending therethrough which allows handle member 30 to slidingly fit over shaft member 26. Along the interior wall of the axial bore 31 is located a ridge or protrusion (not shown) that is cooperatively engageable with an enlarged portion of a slot 33 located towards the upper portion of the elongate portion 28a of elevator member 28. When the protrusion or ridge along the interior wall of the axial bore 31 is engaged with the enlarged portion of slot 33, and handle member 30 is pushed downward and rotated in the appropriate direction to secure the protrusion or ridge within the slot 33, handle member 30 can be rotated in either direction, which rotation will, in turn, rotate elevator member 28 relative to shaft member 26. Handle member 30 may be removed from elevator member 28 by turning handle member 30 in the appropriate direction and positioning the protrusion or ridge associated with axial bore 31 within the enlarged portion of slot 33 thereby allowing the handle member 30 to be released from cooperative engagement with the slot 33. Axial bore 31 may also be threaded so as to threadedly engage the outer portion of the elongated portion 28a of elevator member 28 to likewise secure handle member 30 to elevator member 28 for adjustable movement of member 28 relative to shaft member 26. Still other methods for securing handle member 30 to elevator member 28 can be utilized without departing from the spirit and scope of the present invention.

Elevator member 28 is designed to hold a plurality of fluid treatment tablets T when stackably arranged on platform portion 28b as illustrated in FIGS. 1–3. As noted above, elevator member 28 is adjustably movable along at least a portion of the length of shaft member 26 relative to the fluid level associated with the particular fluid body. This adjustability can be similarly accomplished using a wide variety of known methods such as forming a threaded opening extending through the interior of elevator member 28, the opening being cooperatively threadedly engageable with corresponding threads associated with the exterior of shaft member 26 so as to threadedly adjust elevator member 28 in a vertical direction along the length of shaft member 26 over at least a predetermined portion thereof as discussed above. Still other means for adjustably moving elevator member 28 relative to shaft member 26 are likewise envisioned.

As best shown in FIGS. 2 and 3, the entire assembly of handle member 30, shaft member 26, elevator member 28, and attachment portion 34 is removably attachable to base member 32 which is, in turn, secured to the bottom portion of skimmer basket member 22 by means of backing plate 33 and fasteners 36. As shown in FIG. 4, base member 32 and attachment portion 34 are cooperatively engageable. In the embodiment shown in FIG. 4, base member 32 includes a recessed "X" shaped opening 32a extending at least partially therethrough while attachment portion 34 associated with one end portion of shaft member 26 includes a longitudinally protruding "X" shaped extension portion adapted to be received into opening 32a. It is contemplated that various other mechanisms may be used to secure attachment portion 34 to base member 32. Likewise, although the embodiment shown in FIGS. 1–4 has base member 32 secured to the bottom portion of skimmer basket member 22 by means of backing plate 33 and fasteners 36, the construction and operation of various other attachment mechanisms are well known in the art and many known attachment mechanisms can be easily adapted for use in the present invention.

In operation, once the present device 10 is initially properly positioned within a fluid body such as within a typical swimming pool skimmer device 12, as illustrated in FIG. 1, a plurality of water treatment tablets T, each having a hole or aperture formed therein, are slidably positioned along the elongate portion 28a of elevator member 28 such that the elongate portion 28a is received by and extends through the hole or aperture associated with each respective tablet T. Once the appropriate member of tablets T are positioned on elongate portion 28a, handle member 30 is attached to elevator member 28 as previously explained. With the lowermost tablet resting upon the platform portion 28b of elevator member 28 as shown in FIGS. 1 and 2, elevator member 28 is then adjustably positioned along the length of shaft member 26, by turning handle member 30, such that any portion of one or more of the lowermost tablets T are disposed or immersed in the fluid body for dissolution therein. For example, if only one tablet is required to be immersed within the fluid body to impart the correct amount of chlorine or other chemical to the fluid body, elevator member 28 is adjusted such that only the lowermost tablet T is positioned below the water or other fluid level. As the lowermost tablet T dissolves, the tablet positioned immediately thereabove will slowly enter the water or fluid thereby maintaining a relatively constant tablet surface immersed within the fluid body. This automatic feeding of tablets allows the proper amount of treating agents to be continuously present in the fluid body such that a continuous prescribed dosage or desired concentration of the treating agents is always present in the fluid body for sanitation or other purposes. As the second tablet in the vertically stacked arrangement dissolves, the third tablet in such stacked arrangement will take its place and this process is repeated until all of the tablets are dissolved. In this regard, the last or uppermost tablet positioned in the stackable arrangement could contain a dye, scent, or some other distinguishing characteristic that would tell the user that the last tablet associated with device 10 is in use and the supply of tablets should be replenished for continued automatic water treatment operation.

Loading the present device 10 with additional water treatment tablets T can be easily accomplished by simply disengaging the shaft 26 from base member 32. This can be accomplished by merely exerting a pulling force on handle member 30 sufficient to allow attachment portion 34 associated with one end portion of shaft member 26 to become fully separated from base member 32. This will allow the user to easily load elevator member 28 with the appropriate number of water treatment tablets T and, once member 28 is appropriately loaded and handle member 30 is properly secured thereto, the entire subassembly including shaft member 26, elevator member 28 and handle member 30 can be re-engaged with base member 32 by properly aligning the "X" shaped attachment 34 of shaft member 26 with the corresponding recessed "X" shaped opening 32a associated with base member 32. This arrangement allows base member 32 to stay attached to the skimmer basket member 22 during the reloading operation thereby simplifying the reloading operation. Importantly, the entire subassembly 26, 28 and 30 can be removed leaving base member 32 fixedly attached to the skimmer basket member 22 not only for reloading tablets T onto platform portion 28b, but also for allowing the basket member 22 to be easily cleaned of debris. In addition, the subassembly 26, 28 and 30 can be easily reinserted into base member 32 without readjusting the positioning of platform portion 28b relative to the fluid level.

The total number of tablets T that may be stackably arranged on the present device 10 will depend upon the length of elongate portion 28a of elevator member 28 which will, in turn, be limited by the dimensions of the skimmer device, tank, or other device in which the present device 10 is to be used. Depending upon the particular application involved as well as the particular composition and solubility of the tablets involved, it may be necessary to only immerse a portion of one tablet, or it may be necessary to immerse more than one tablet within the fluid body in order to achieve the desired concentration of treating agents within the fluid body. The present device 10 therefore allows maximum utilization of whatever dry head space exists in the particular application, whether such application is a pool skimmer device as just described, or some other water treating application such as a toilet bowl tank, an automatic chlorine feeder, or an open portion of a swimming pool as will be hereinafter further explained.

Figure 5:
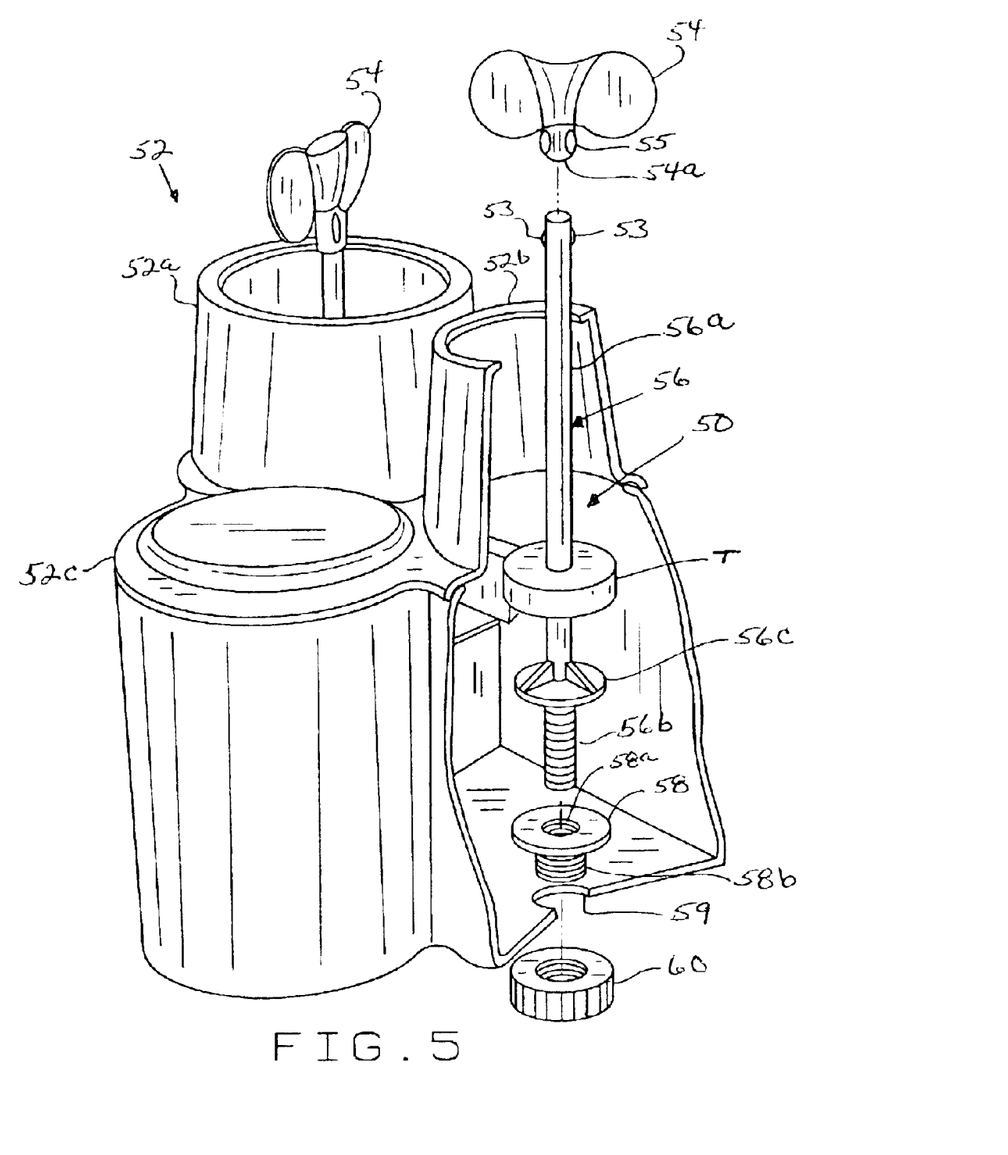
FIG. 5 is a perspective cut-away view of a typical automatic chlorinator device wherein another embodiment of the present feeder device is shown in an exploded view contained within the chlorinator device.
Figure 6:
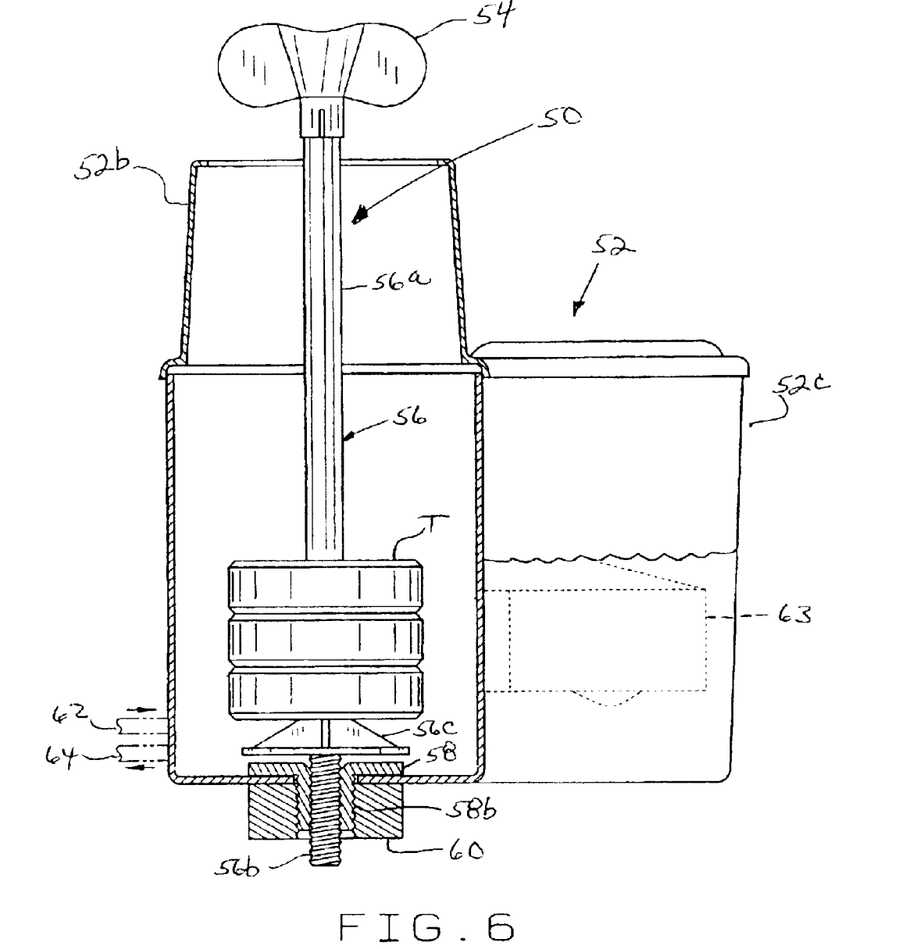
FIG. 6 is a cross-sectional side elevational view of the chlorinator device of FIG. 5 wherein the present feeder device is operatively positioned therein.

FIGS. 5 and 6 illustrate another embodiment 50 of the present tablet feeder device wherein the device is placed within an automatic chlorinator 52. FIG. 5 is a cut-away perspective view of a typical automatic chlorinator device. The present tablet feeder device 50 is shown contained within automatic chlorinator 52, the operation of which is well known in the art. A typical chlorinator device such as device 52 typically contains a feeder pack, feeder pouch or similar structure having therein chemicals such as chlorine. The device includes three compartments, 52a, 52b and 52c, each in fluid communication with the others. The feeder pack used in such a typical automatic chlorinator may be housed within compartment 52a or 52b or, if desired, a separate feeder pack may be placed in each compartment. The level of water within the automatic chlorinator is maintained at a predetermined level by floater arm 63 (FIG. 6). The feeder pack or pouch is placed within automatic chlorinator 52 and the side of the pack is punctured at various locations on the pouch depending upon how much chlorine is to be imparted into the fluid body, thereby allowing the release of chemicals into the water cycled through automatic chlorinator 52.

FIG. 5 illustrates one embodiment of the present feeder device 50 adapted for use with a typical automatic chlorinator. Device 50 includes a handle member 54, an elevator member 56, an attachment or base member 58, and a locking nut or other fastener or retainer member 60 for securing base or attachment member 58 to the automatic chlorinator 52. Elevator member 56 further includes an elongate portion 56a, a threaded portion 56b, and a platform portion 56c. Base member 58 further includes a threaded opening or aperture 58a sized and shaped to receive threaded portion 56b of elevator member 56, and a lower threaded portion 58b. Locking nut 60 has a threaded aperture sized and shaped to receive lower threaded portion 58b of base member 58.

As in the previous embodiment of the present device described above, tablets T are stackably arranged along the length of elongate portion 56a of member 56 and rests upon platform portion 56c. Elevator member 56 is raised and lowered by turning handle member 54, which is removably attached to elongate portion 56a as will be hereinafter explained, which in turn moves threaded portion 56b either up or down within base member 58. Base member 58 is secured to the bottom portion of automatic chlorinator 52 by engagement of lower threaded portion 58b with the threaded aperture of locking nut 60, the threaded portion 58b extending through an opening 59 located at the bottom of compartment 52b. In this embodiment, handle member 54 is secured to elevator member 56 by cooperative engagement of depressible spherical members 53, which are fixedly attached to and retained within elongate portion 56a of elevator member 56, with circular openings 55 located in the lower shaft portion 54a of handle member 54. When elongate portion 56a is slidably inserted into the shaft portion of handle member 54, depressible spherical members 53 are depressed such that they slide within handle shaft portion 54a. Once depressible spherical members 53 reach circular openings 55, they move outwardly to fill the openings 55 thereby locking handle member 54 onto elevator member 56. To unlock handle member 54, the user simply depresses spherical members 53, for example, with a thumb and forefinger, and pulls handle member 54 off of elongate portion 56a. The principles set forth above with respect to the positioning of tablets T beneath the level of the fluid body, the replacing of one tablet T by another as it dissolves, and methods of alerting the user to the fact that the last tablet is in use, are similar with respect to this embodiment 50 as previously explained with respect to embodiment 10 discussed above.

FIG. 6 shows embodiment 50 of the present feeder device located in operable position within a typical automatic chlorinator 52. Automatic chlorinator 52 is placed within the water flow circuit of a standard pool such that water leaving the pool through the main drain and/or various skimmer devices is pumped into automatic chlorinator 52 through water inlet portion 62. The water level within automatic chlorinator 52 is regulated by floater arm 63. Once the water is inside automatic chlorinator 52, it comes into contact with at least a portion of one tablet T and the tablet begins to dissolve, releasing chemicals into the water. Because of the pressure of water entering automatic chlorinator 52 through water inlet portion 62, water inside automatic chlorinator 52 is forced out of device 52 through outlet portion 64. This water, now adequately chlorinated, re-enters the water flow circuit of the pool and is thus pumped, properly chlorinated, back into the fluid body of the pool. Feeder device 50 can be utilized with any reservoir that maintains a constant fluid level and a positive pressure through the use of a pump or other pressure maintaining device.

Figures 7, 8:
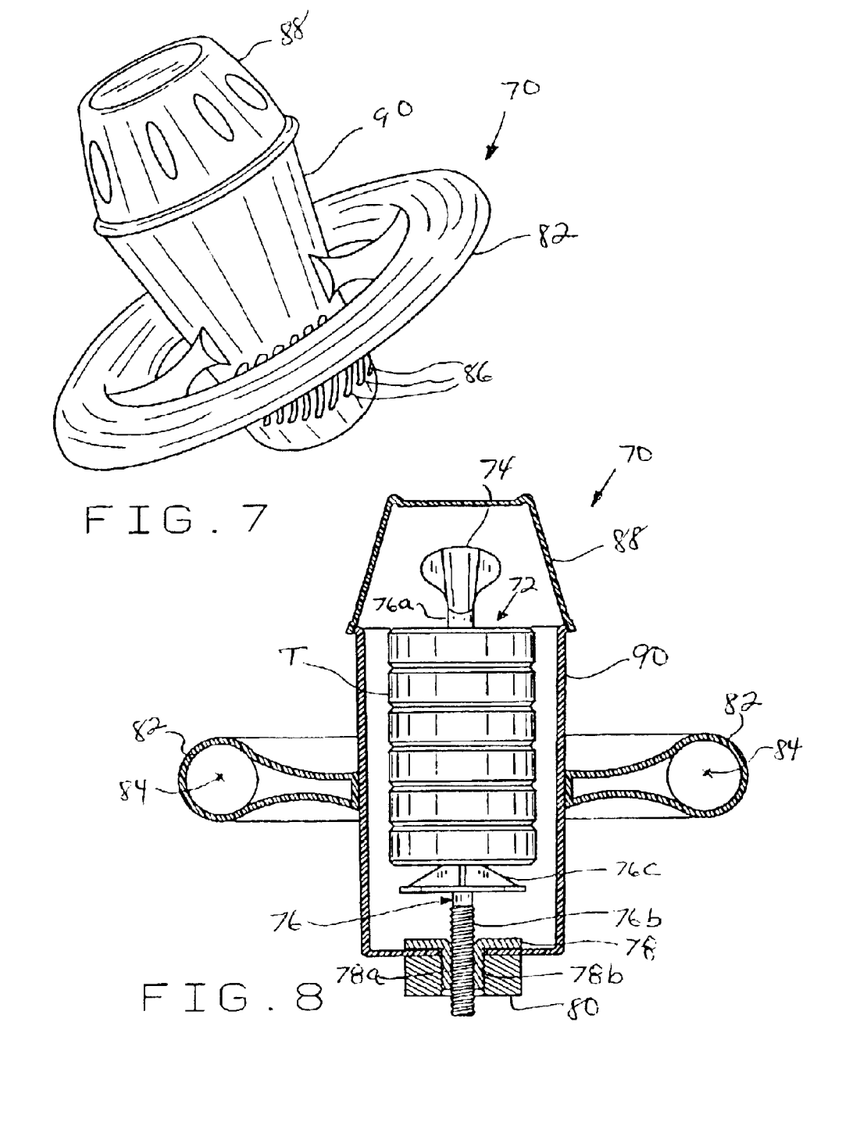
FIG. 7 is a perspective view of still another embodiment of a feeder device constructed in accordance with the teachings of the present invention.
FIG. 8 is a cross-sectional view of the feeder device of FIG. 7.

FIGS. 7 and 8 illustrate another embodiment 70 of the present tablet feeder device designed for use in a free-standing body of water such as a swimming pool. This embodiment of the present feeder device is similar in structure to the embodiment described above for use in an automatic chlorinator, except that in this embodiment, the feeder device 72 is housed within a free-floating flotation device 70. As best shown in FIG. 8, the tablet feeder device 72 includes a handle member 74, an elevator member 76, a base member 78, and a locking nut or other retainer member 80 for securing base member 78 to flotation device 70. Elevator member 76 further includes an elongate portion 76a, a threaded portion 76b and a platform portion 76c. Base member 78 further includes a threaded aperture 78a sized and shaped to receive threaded portion 76b of elevator member 76, and a lower threaded portion 78b. Locking nut 80 has an aperture sized and shaped to receive lower threaded portion 78b of base member 78 as illustrated in FIG. 8 thereby fixedly securing base member 78 to the flotation device 70. The construction and operation of feeder device 72 including members 74, 76, 78 and 80 is substantially identical to the construction and operation of feeder device 50 including members 54, 56, 58 and 60.

Flotation device 70, which houses tablet feeder device 72, includes a buoyant portion 82, a body portion 90, and a removable cap portion 88. Buoyant portion 82 is preferably a hollow annular ring, but it is contemplated that any structure suitable for allowing the device to float could be used. Body portion 90 includes a plurality of openings 86 through which water may enter the device 70 and contact the tablets T located therein on feeder device 72. In this embodiment, the fluid level of the fluid body in which the device 70 will float is represented by a line extending through the centerline of the buoyant portion 82, which centerline includes the points 84 illustrated in FIG. 8. The principles set forth above with respect to the positioning of the tablets T beneath the level of the fluid body, the replacing of one tablet T by another as it dissolves, and methods of alerting the user to the fact that the last tablet is in use, are similar with respect to embodiment 72 as previously explained above with respect to embodiments 10 and 50.

Figure 9:
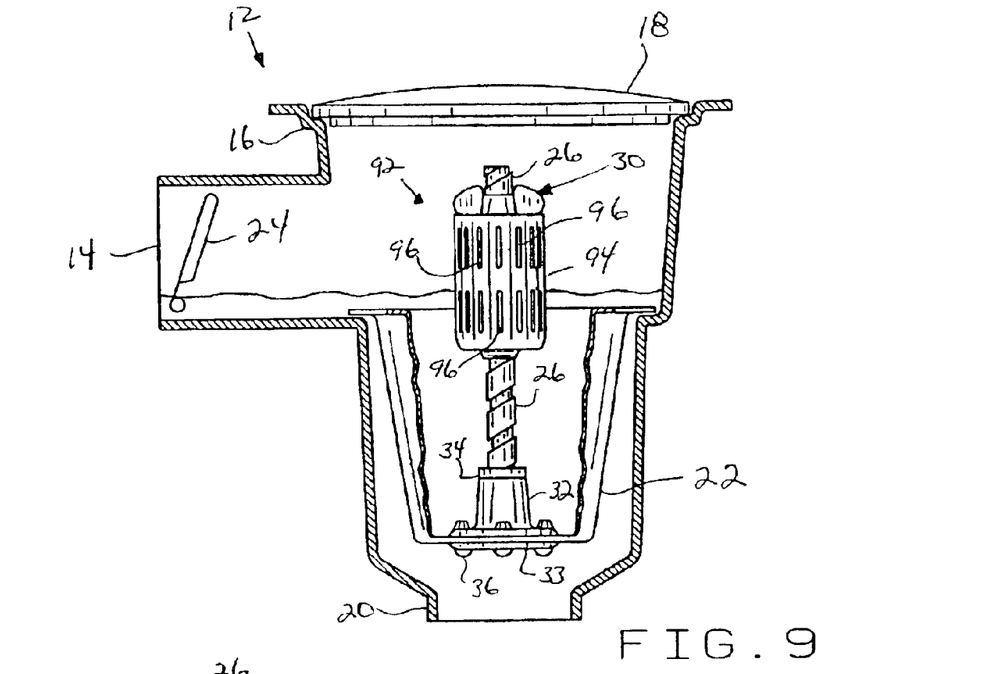
FIG. 9 is a cross-sectional view of a typical skimmer device illustrating still a further embodiment of the present feeder device operatively positioned therein.
Figure 10:
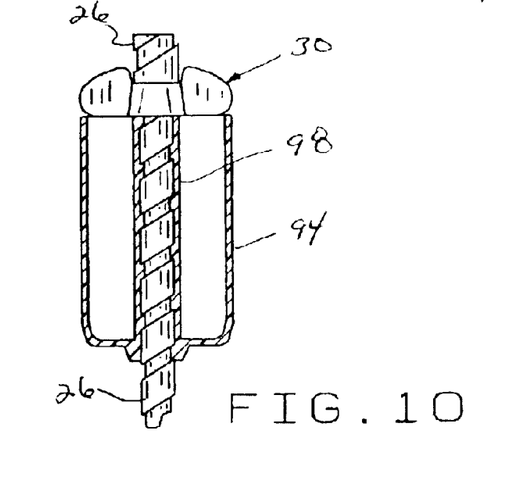
FIG. 10 is a partial cross-sectional view of the feeder device of FIG. 9.

FIGS. 9 and 10 illustrate still another embodiment 92 of the present invention adaptable for use with a typical pool skimmer device 12. This embodiment 92 of the present invention includes handle member 30, shaft member 26, base member 32, attachment portion 34, backing plate 33, and fasteners 36 of the embodiment 10 described above. The construction and operation of these members is as previously explained. Elevator member 28 associated with embodiment 10, has now been replaced with basket member 94 which is constructed of plastic or other suitable material. Basket member 94 is designed to receive solid water treatment reagents in granular rather than tablet form. Basket member 94 has a plurality of openings 96 that allow water or other fluid to contact the granular water treatment reagents within basket member 94, while preventing the granules from being washed out of basket member 94 and into the fluid body. As best shown in FIG. 10, basket member 94 has a central bore 98 that is threaded, sized and shaped to receive shaft member 26 therein. Thus, the position of basket member 94 can be adjusted along the length of shaft member 26 in a similar fashion as previously explained by turning handle member 30 which is also threaded onto shaft member 26 and secured to the basket member 94 by any suitable means as previously explained. As basket member 94 is raised or lowered, the number of granules in contact with the fluid body is altered accordingly, and thus the dosage or concentration of chemical additive imparted to the fluid body is altered. As the granules in contact with the fluid body are dissolved, they are replaced by other granules contained within basket member 94 above the level of the fluid body. Thus, the concentration of additive in the fluid body is maintained at a constant level.

Basket member 94 may also be constructed with threaded openings only at the top and bottom of the basket rather than with a central bore extending therethrough. This is not, however, preferred, as in this embodiment the dissolving granules would be in direct contact with the threads of shaft member 26 and residue from the granules may form on the shaft member thereby decreasing the ease at which basket member 94 is raised or lowered along the length of shaft member 26.

Although the embodiments of the present invention described above have been described in association with a swimming pool, a pool skimmer device, and a pool automatic chlorinator, it is recognized and anticipated that the various embodiments of the present feeder device could likewise have utility in a wide variety of other fluid treatment applications wherever a supply of agents of any type must be added to the fluid body. For example, the present devices could be easily adaptable for use in an animal feeding application wherein nutrients and other vitamins could be provided in solid tablet or granular form for dissolution in the drinking water or liquid feed being provided to a wide variety of different types of animals in a farm or feed lot environment. In similar fashion, the present invention can likewise be utilized in sewage treatment applications; cleaning, laundry, and dish washing applications; cooling tower and other water supply applications; and in a wide variety of other applications where soluble agents in tablet or granular form can be provided to a fluid body to achieve a specific purpose. In this regard, it is recognized that various forms of the present feeder device could be utilized without departing from the spirit and scope of the present invention.

It is also recognized and anticipated that the cross-sectional shape of elongate portions 28a, 56a, and 78a of elevator members 28, 56, and 78, respectively, could take on a wide variety of different shapes including a circular cross-section, a triangular cross-section, and a diamond-shaped cross-section, as well as a variety of other cross-sectional shapes. In this regard, it is recognized that all of the cooperatively engagable threaded constructions disclosed in the various embodiments illustrated in FIGS. 1–10 are specifically adapted for use with a substantially circular or rod-shaped elongate portion associated with each respective shaft member. If other cross-sectional shapes are utilized for these members, all openings or apertures constructed to receive such members will be correspondingly shaped and, importantly, adjustment members such as various threaded members would be replaced with other slidably engagable clamping or pinching members constructed to conform to the particular cross-sectional shape of the respective elongate portion to which it will be attached. Further, the hole or aperture through each of the respective tablets T would likewise be formed so as to be compatible with the cross-sectional shape of the elongate portions over which they will be positioned.

By varying the shape of the tablet hole and elongate portions, it is also possible to customize the feeder device and tablet products for a given marketer. For example, marketer A could have a tablet with a substantially round hole for use with a substantially round elongate portion; marketer B could have a tablet with a substantially square hole for use with a substantially square elongate portion; and marketer C could have a tablet with a substantially triangular hole for use with a triangular elongate portion. It is also recognized and anticipated that the present device could be attachable to any wall or surface associated with containment of the particular fluid body depending upon the particular application involved.

It is further recognized and anticipated that the present feeder devices will work with any size or shape of tablet either with or without a hole or aperture formed in the middle thereof. Although use of a tablet having a hole associated therewith is generally preferred because it is easier to load and hold a stack of tablets on any one of the elevator members, it is recognized that the present device could be configured to hold a plurality of tablets T adjacent their outer peripheral surface. For example, a basket or cage member could be attached to a shaft member along at least a portion of its outer peripheral surface, thus the basket or cage member would not have a central bore because the shaft member would be attached to the outer surface of the basket or cage rather than extending through the center thereof. The basket member could contain soluble water treating agents in the form of granules or tablets, while the cage member would serve primarily to contain the tablet form of soluble water treatment agents. Still other mechanisms for accomplishing the holding of a plurality of tablets without a hole or aperture formed therein are recognized and envisioned.

Regardless of the particular application, and regardless of the particular embodiment utilized, the present invention provides a simple, economical device that will store a plurality of fluid treatment or other additive type tablets or granules and will automatically feed such tablets or granules into the fluid body so as to maintain a relatively constant tablet or granule surface area within the fluid body so as to deliver a substantially continuous prescribed water treatment or additive dosage to the fluid body. The platform and basket members associated with the present device are adjustably positionable so as to immerse any portion or any number of tablets or granules within the fluid body depending upon the particular prescribed dosage required for that particular fluid body, and as the lowermost tablet or granules begin dissolution, the next adjacent tablet or granules will enter the fluid body thereby providing a relatively constant feed of treating agents or additives to the fluid body.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure, and the appended claims.

What is claimed is:

1. A device for automatically feeding at least one soluble fluid treating agent into a fluid body comprising:
   at least one shaft member;
   a holding member for holding said at least one soluble fluid treating agent, said holding member being selectively positionable relative to at least a portion of the length of said at least one shaft member so as to adjustably position the at least one soluble fluid treating agent relative to the fluid body;
   an attachment portion fixedly attached to said shaft member; and
   a base member sized and shaped to removably receive said attachment portion.

2. The device of claim 1 wherein the soluble fluid treating agent is provided in tablet form.

3. The device of claim 2 wherein said holding member includes a platform member adaptable for holding said tablets in a stackable arrangement.

4. The device of claim 1 wherein the soluble fluid treating agent is provided in granular form.

5. The device of claim 4 wherein said holding member includes a basket member adaptable for holding said granular fluid treating agent.

6. The device of claim 1 further including a handle member removably attachable to said holding member, said holding member being selectively moveable relative to said shaft member by moving said handle member.

7. The device of claim 1 wherein the fluid body is contained within a structure, said base member being fixed attached to said structure.

8. The device of claim 1 further including:
   a buoyant member;
   a body portion fixedly attached to said buoyant member, said body portion being substantially hollow and having a plurality of openings therein to allow fluid communication with the interior thereof;
   a cap portion removably attached to said body portion for allowing access to the interior of said body portion;
   said at least one shaft member, said holding member and said base member being housed within said body portion.

9. A device for automatically feeding a plurality of soluble tablets into a fluid body comprising:
   at least one shaft member;
   an elevator member having an elongate portion adaptable for holding the tablets in a stackable arrangement, said elevator member being engageable with said shaft member and being selectively positionable relative to at least a portion of the length of said at least one shaft member; and
   a base member sized and shaped to removably engage said shaft member.

10. The device of claim 9 wherein said elevator member further includes a platform portion for positioning the tablets in stackable arrangement thereon.

11. The device of claim 9 wherein each of said plurality of tablets includes an opening extending therethrough adaptable for receiving the elongate portion of said elevator member, each of the plurality of tablets being slidably positionable onto said elongate portion.

12. The device of claim 9 further including a handle member removably attachable to said elevator member, said elevator member being selectively moveable relative to at least a portion of the length of said at least one shaft member by moving said handle member.

13. The device of claim 9 wherein said elevator member includes an opening extending therethrough adaptable for receiving said shaft member.

14. The device of claim 13 wherein the opening extending through said elevator member and said shaft member are cooperatively threadedly engagable.

15. The device of claim 9 wherein the fluid body is contained within a skimmer device, said skimmer device including a skimmer basket having a floor portion associated therewith, said base member being attachable to the floor portion of said skimmer basket.

16. A device for automatically feeding a plurality of soluble tablets into a fluid body associated with a skimmer device, said device comprising:
   at least one shaft member;
   an elevator member for holding the plurality of tablets, said elevator member being engageable with said shaft member and being adjustably positionable along at least a portion of the length of said shaft member;
   an attachment portion fixedly attached to said shaft member; and
   a base member sized and shaped to removably receive said attachment portion such that when said attachment portion is engaged with said base member said elevator member can be positioned relative to the fluid body such that any portion of one or more of the plurality of tablets can be immersed within the fluid body.

17. The device of claim 16 wherein said elevator member includes an opening extending therethrough adaptable for receiving said shaft member.

18. The device of claim 17 wherein the opening extending through said elevator member and said shaft member are cooperatively threadedly engagable.

19. The device of claim 16 further including a handle member removably attachable to said elevator member, said handle member enabling said elevator member to be selectively positionable relative to at least a portion of the length of said at least one shaft member.

20. A device for automatically feeding a plurality of soluble tablets into a fluid body associated with an automatic chlorinator, said device comprising:
   an elevator member adaptable for holding the plurality of tablets, said elevator member being adjustably positionable such that any portion of one or more of the plurality of tablets can be immersed within the fluid body; and an attachment member for positioning said elevator member relative to the fluid body, said attachment member being adapted to removably receive said elevator member for movement relative thereto, said attachment member being attached to the automatic chlorinator.

21. The device of claim 20 wherein said attachment member includes an opening extending therethrough, said attachment member opening and at least a portion of said elevator member being cooperatively threadedly engageable, said elevator member being adjustably moveable relative to said attachment member.

22. The device of claim 21 further including a handle member removably attachable to said elevator member, rotation of said handle member threadedly moving said elevator member relative to said attachment member so as to adjustably position any portion of one or more of the plurality of tablets within the fluid body.

23. The device of claim 22 wherein said attachment member includes a retainer portion for attaching said attachment member to the automatic chlorinator.

24. The device of claim 20 wherein each tablet includes an opening extending therethrough adaptable for receiving at least a portion of said elevator member.

25. A floatation device for feeding a plurality of soluble tablets into a fluid body comprising:
    a buoyant member;
    a body portion fixedly attached to said buoyant member, said body portion being substantially hollow and having a plurality of openings therein to allow fluid communication with the interior thereof;
    a cap portion removably attached to said body portion for allowing access to the interior of said body portion;
    an elevator member adaptable for holding the plurality of tablets, said elevator member being adjustably positionable such that any portion of one or more of the plurality of tablets can be immersed within the fluid body; and
    a base member removably attachable to said body portion; said base member being adapted to removably receive at least a portion of said elevator member, said elevator member being adjustably moveable relative to said base member for positioning said elevator member relative to the fluid level.

26. The flotation device of claim 25 wherein said base member includes an opening extending therethrough, said base member opening and at least a portion of said elevator member being cooperatively threadedly engageable.

27. The flotation device of claim 25 including a handle member removably attachable to said elevator member, movement of said handle member adjustably positioning said elevator member within the fluid body.

28. The flotation device of claim 25 wherein each tablet includes an opening extending therethrough adaptable for receiving at least a portion of said elevator member.

29. A device for automatically feeding a plurality of soluble granules in a fluid body comprising:
    at least one shaft member;
    a basket member adaptable for holding the granules, said basket member being engageable with said shaft member and being selectively positionable relative to at least a portion of the length of said at least one shaft member; and
    a base member sized and shaped to removably receive said shaft member.

30. The device of claim 29 further including a handle member removably attachable to said basket member, said basket member being selectively moveable relative to at least a portion of the length of said at least one shaft member by moving said handle member.

31. The device of claim 29 wherein said basket member includes an opening extending therethrough adaptable for receiving said at least one shaft member.

32. The device of claim 31 wherein said opening extending through said basket member and said at least one shaft member are cooperatively threadedly engagable.

33. The device of claim 29 wherein the fluid body is contained within a skimmer device, said skimmer device including a skimmer basket having a floor portion associated therewith, said base member being attachable to the floor portion of said skimmer basket.

34. A device for automatically feeding a plurality of soluble granules into a fluid body associated with a skimmer device, said device comprising:
    at least one shaft member;
    a basket member adaptable for holding the granules, said basket member being selectively positionable relative to at least a portion of the length of said at least one shaft member;
    an attachment portion fixedly attached to said shaft member; and
    a base member sized and shaped to removably receive said attachment portion such that when said attachment portion is engaged with said base member said basket member can be positioned relative to the fluid body such that any portion of the plurality of granules can be immersed within the fluid body.

35. The device of claim 34 wherein said basket member includes an opening extending therethrough adaptable for receiving said at least one shaft member.

36. The device of claim 34 wherein the opening extending through said basket member and said at least one shaft member are cooperatively threadedly engagable.

37. The device of claim 34 further including a handle member removably attachable to said basket member, said basket member being selectively moveable relative to at least a portion of the length of said at least one shaft member by moving said handle member.

38. A device for automatically feeding a plurality of soluble granules into a fluid body associated with an automatic chlorinator, said device comprising:
    at least one shaft member;
    a basket member for holding the plurality of granules, said basket member being adjustably positionable relative to at least a portion of the length of said at least one shaft member such that any portion of the plurality of granules can be immersed within the fluid body; and
    a base member adapted to removably receive said at least one shaft member, said base member being attached to the automatic chlorinator.

39. The device of claim 38 further including a handle member removably attachable to said basket member, said basket member being selectively moveable relative to at least a portion of the length of said at least one shaft member by moving said handle member.

40. A floatation device for feeding a plurality of soluble granules into a fluid body comprising:
    a buoyant member;
    a body portion fixedly attached to said buoyant member, said body portion being substantially hollow and having a plurality of openings therein to allow fluid communication with the interior thereof;
    a shaft member;

a basket member adapted for holding the plurality of granules, said basket member being engageable with said shaft member and being selectively positionable relative to at least a portion of the length of said shaft member; and a base member removably attachable to said body portion, said base member being adapted to removably receive said shaft member.

* * * * *

UNITED STATES PATENT AND TRADEMARK OFFICE
CERTIFICATE OF CORRECTION

PATENT NO. : 6,790,353 B2
DATED : September 14, 2004
INVENTOR(S) : Thomas V. Connelly Jr.

It is certified that error appears in the above-identified patent and that said Letters Patent is hereby corrected as shown below:

<u>Title page,</u>
Item [73], Assignee, delete "Solutia, Inc., St. Louis, MO" and replace with -- Stellar Manufacturing Company, Sauget, IL --.

Signed and Sealed this

Twenty-fifth Day of April, 2006

JON W. DUDAS
*Director of the United States Patent and Trademark Office*